(12) United States Patent
Wu et al.

(10) Patent No.: US 12,336,449 B2
(45) Date of Patent: Jun. 24, 2025

(54) PNEUMATIC SERIAL DEVICE FOR APPLYING MATERIALS TO DEEP SOIL LAYER AND METHOD THEREFOR

(71) Applicant: CHENGDU TOBEST DIYUAN TECHNOLOGY CO., LTD., Sichuan (CN)

(72) Inventors: Fucheng Wu, Sichuan (CN); Xiaoming Liu, Sichuan (CN); Jialin Li, Sichuan (CN)

(73) Assignee: CHENGDU TOBEST DIYUAN TECHNOLOGY CO., LTD., Sichuan (CN)

( * ) Notice: Subject to any disclaimer, the term of this patent is extended or adjusted under 35 U.S.C. 154(b) by 806 days.

(21) Appl. No.: 17/634,943

(22) PCT Filed: Jul. 13, 2020

(86) PCT No.: PCT/CN2020/101705
§ 371 (c)(1),
(2) Date: Feb. 11, 2022

(87) PCT Pub. No.: WO2021/027463
PCT Pub. Date: Feb. 18, 2021

(65) Prior Publication Data
US 2022/0295693 A1    Sep. 22, 2022

(30) Foreign Application Priority Data

Aug. 13, 2019    (CN) .......................... 201910742600.8

(51) Int. Cl.
*E02D 3/12*    (2006.01)
*A01C 15/02*    (2006.01)
(Continued)

(52) U.S. Cl.
CPC .............. *A01C 23/04* (2013.01); *A01C 15/02* (2013.01); *A01C 23/026* (2013.01);
(Continued)

(58) Field of Classification Search
CPC ....... A01C 23/04; A01C 15/02; A01C 23/026; E02D 3/12; B05B 7/0075; B05B 7/0416; A01B 77/00; A01G 29/00
See application file for complete search history.

(56) References Cited

U.S. PATENT DOCUMENTS 2,083,153 A * 6/1937 Irish ........................ A01B 79/00
405/39
2,242,789 A * 5/1941 McFee ................... A01G 29/00
239/271
(Continued)

FOREIGN PATENT DOCUMENTS

WO    WO-2016129712 A1 * 8/2016    ............. A01B 13/08

*Primary Examiner* — Kyle Armstrong
(74) *Attorney, Agent, or Firm* — Chun-Ming Shih; LANWAY IPR SERVICES

(57) ABSTRACT

The present disclosure relates to a pneumatic serial device for spraying materials into a deep soil layer and an implementation method thereof. The device comprises a material spraying injector (1), a air blasting system (2) connected with the material spraying injector (1), and a material feeding system (3), wherein the air blasting system (2) and the material feeding system (3) are connected with the material spraying injector (1) in series in sequence, wherein the air blasting system (2) comprises a high-pressure air tank (2-1) and a quick relieve valve (2-2), the material feeding system (3) comprises a material chamber (3-1), a feeding valve (3-2), a valve I (3-3), a material sending chamber (3-4), a valve II (3-5) and a material delivery pipe (3-6) which are connected to each other in sequence, and the material delivery pipe (3-6) extends into the high-pressure air tank (2-1) and is communicated with the quick relieve
(Continued)

valve (2-2) at the bottom thereof. Combined with the implementation method thereof, the device can uniformly apply a certain amount of various materials into the soil layer at any depth, replacing the traditional method, greatly improving the operation efficiency of applying materials into the deep soil layer, significantly reducing the cost of applying materials into the deep soil layer, and reducing the labor intensity.

7 Claims, 1 Drawing Sheet

(51) Int. Cl.
    *A01C 23/02*     (2006.01)
    *A01C 23/04*     (2006.01)
    *B05B 7/00*     (2006.01)
    *B05B 7/04*     (2006.01)
    *A01B 77/00*     (2006.01)
    *A01G 29/00*     (2006.01)

(52) U.S. Cl.
    CPC .......... *B05B 7/0075* (2013.01); *B05B 7/0416* (2013.01); *E02D 3/12* (2013.01); *A01B 77/00* (2013.01); *A01G 29/00* (2013.01)

(56) References Cited

U.S. PATENT DOCUMENTS

| | | | | |
|---|---|---|---|---|
| 4,682,550 A * | 7/1987 | Joy | ...... | A01C 23/026 |
| | | | | 111/7.1 |
| 5,802,996 A * | 9/1998 | Baxter | ...... | A01C 23/026 |
| | | | | 172/21 |
| 6,973,885 B2 * | 12/2005 | Fulgham | ...... | A01C 23/026 |
| | | | | 175/71 |

* cited by examiner

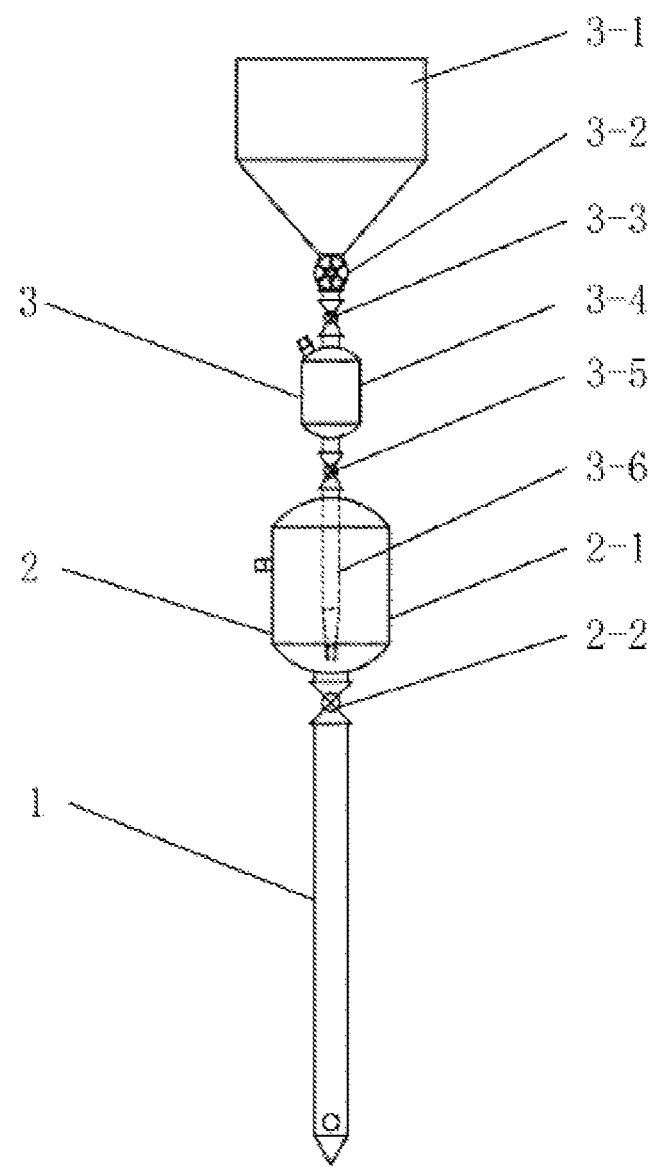

PNEUMATIC SERIAL DEVICE FOR APPLYING MATERIALS TO DEEP SOIL LAYER AND METHOD THEREFOR

TECHNICAL FIELD

The present disclosure belongs to the technical field of spraying materials into a deep soil layer, and in particular relates to a pneumatic serial device for spraying materials into a deep soil layer and a method thereof.

BACKGROUND ART

Soil is the foundation of human activities and the root of human survival and development. With the rapid development of economy and society, the demand for soil by human activities has seriously overdrawn the carrying capacity of soil, which leads to the hardening, degradation and pollution of the soil that nurtures us. This overdrawing activity not only damages and affects the surface soil, but also further damages and affects the deep soil. How to repair and improve the soil, maintain and rebuild the deep soil has been faced with the embarrassing situation that no one is willing to do manual work, there is nothing to do in technical means and there is no machine used in the operating device. This situation is not only in the fields of shallow soil remediation and improvement such as agricultural soil, rejuvenation of ancient trees, sponge city construction, turf care, landscaping, but also in the fields of deep soil remediation such as environmental protection, groundwater pollution control, soil contaminated site remediation, mine remediation and desert remediation. Whether it is shallow soil remediation and improvement or deep soil remediation, the core technology or the first principle at present is to uniformly mix the materials for soil remediation and improvement with the target soil, especially for in-situ soil remediation and improvement. In order to achieve in-situ uniform mixing of materials and soil, the existing methods are as follows.

Materials are sprayed in a shallow soil layer (the depth of the soil layer is within 0~1 m). The main methods are as follows: digging and mixing materials with artificial hoes and shovels; spraying the materials on the soil surface manually or using a spraying device, and then using a power device such as a tractor to drive an operation device such as a rotary tiller to mix the materials sprayed on the surface into the soil, or using an engineering device such as an excavator and a forklift to carry related machines and tools to mix various materials into the soil layer.

Materials are sprayed in a deep soil layer (the depth of the soil layer is within 1~30 m). The main methods are as follows: digging pits, ditches and grooves with excavators, mixing and stirring the materials with the soil layer, and then filling in the soil layer; or drilling a hole with a drill, then pouring the prepared liquid reagent into the hole, and using liquid infiltration to realize the diffusion of the reagent in the soil layer, in order to speed up the reaction process, generally pressing high-temperature and high-pressure steam into the soil layer from the drill hole, and at the same time, using air-phase extraction to accelerate the remediation and treatment of the soil layer pollution.

The above device has the following shortcomings, which are shown mainly as follows.

In the field of shallow soil remediation and improvement, the device and the method related to material are mainly limited to surface spraying, and then the soil and materials are stirred and mixed by digging tools such as hoes, plows, shovels, excavators and forklifts, etc. The existing defects are mainly as follows: first, the surface soil and the soil aggregate structure are destroyed; second, there are many factors that restrict operation, including but not limited to topography, types of crops, types of applied materials, operation season, etc.; third, the operation efficiency is low, the effect is poor, the cost is high, the process is complicated, and the labor intensity is high.

The device and the method related to material spraying are mainly limited to drilling holes, injecting chemicals, high-temperature and high-pressure pressurization, extraction treatment and other process links for soil remediation and improvement in the deep soil layer. The existing defects are mainly as follows: first, the types of mixed materials are limited, and the applied chemicals are limited to air and liquid chemicals with osmotic diffusion function, which cannot diffuse solid powder and granular materials; second, the process is complicated, the cycle is long, the investment is high, the efficiency is low, and the mixing treatment is uneven and incomplete; third, the application scope is narrow, and it is powerless for mine remediation, desert control and groundwater pollution control.

To sum up, it is necessary to develop a device for spraying materials into the soil layer at any depth, which has high operation efficiency, uniform material spraying, accurate material spraying amount, low operation cost and low labor intensity, and is better suitable for the remediation and improvement of various types of soils at present, which will have important practical significance.

SUMMARY

In order to solve the above technical problems, the present disclosure proposes a pneumatic serial device for spraying materials into the deep soil layer and a method thereof, so as to meet the demand of spraying materials into the soil layer. Through the material spraying device combined with the method of the present disclosure, a certain amount of various materials can be uniformly applied into the soil layer at any depth. Compared with the traditional operation mode, the present disclosure has high operation efficiency, uniform material spraying, accurate material spraying amount, low labor intensity and low operation cost.

One of the purposes of the present disclosure is to provide a pneumatic serial device for spraying materials into a deep soil layer. In order to achieve the above purpose, the technical scheme adopted by the present disclosure is as follows.

The present disclosure relates to a pneumatic serial device for spraying materials into a deep soil layer, wherein the device comprises a material spraying injector, a air blasting system connected with the material spraying injector, and a material feeding system, wherein the air blasting system and the material feeding system are connected with the material spraying injector in series in sequence.

The interior of the material spraying injector is a hollow pipe, which can be a round pipe or a square pipe with a diameter of 10 mm to 200 mm; the lower end is tapered and closed, and the peripheral wall of the lower end is provided with a channel hole for compressed air and materials; the length is determined according to the depth of the soil layer where the materials are applied as required, which can be 10 cm~30 m, and can be divided into single or multiple connected pipes according to the length; when the material is applied, the pipe needs to be placed in the required depth of the soil layer, which is the channel for blasting air and materials to enter the soil layer.

The air blasting system comprises a high-pressure air tank and a quick relieve valve, the high-pressure air tank is fixedly connected with the quick relieve valve, and the quick relieve valve is connected with the material spraying injector. The air blasting system is used for instantly releasing blasting air into the soil layer through the material spraying injector and forming a shock wave blasting soil layer.

Further, when and only when the pores inside the soil layer for filling materials are insufficient, the high-pressure compressed air stored in the high-pressure air tank is instantly released through the quick relieve valve and sprayed into the soil layer through the material spraying injector to form air blasting, thereby forming cracks in the soil layer for filling space of materials.

Further, both the air pressure and the air capacity of the high-pressure air tank can be optimally selected according to the texture and depth of the soil layer, the air pressure in the high-pressure air tank can be optimally selected to be 0.5-5 MPa, and the air capacity of the high-pressure air tank can be optimally selected to be 5-200 L.

Further, the quick relieve valve is used to cut off/communicate the high-pressure air tank and the material spraying injector. The quick relieve valve can be a ball valve, a gate valve, etc., and its power is electrical, hydraulic, pneumatic or mechanical drive. It has the function of quick turning on and off. The airtight pressure grade of the quick relieve valve can be 0.5-5 MPa.

The material feeding system comprises a material chamber, a feeding valve, a valve I, a material sending chamber, a valve II and a material delivery pipe which are connected to each other in sequence, and the material delivery pipe extends into the high-pressure air tank and is communicated the quick relieve valve at the bottom thereof.

Further, the material chamber is used to store a large amount of materials to be applied to the soil layer, and the volume of the material chamber can be comprehensively optimally selected according to the amount of material to be applied and the operation time; the shape, structure, size and material of the material chamber can be optimally selected according to the nature of the material, the lower part of the material chamber can be tapered, and the taper angle is equal to or close to the material stacking angle, so that the material can fall, and the material chamber can be made of carbon steel, stainless steel, aluminum alloy, plastic, etc.

Further, the feeding valve is used to accurately measure the amount of materials entering the material sending chamber. The feeding valve is rotary, its power is electrical, hydraulic, pneumatic or mechanical drive, and its rotating speed and material amount of a single rotation are determined by the material amount needing to enter the material sending chamber.

Further, valve I is used to cut off/communicate the feeding valve and the material sending chamber, so as to ensure the airtight isolation between the material sending chamber and the material chamber when the material sending chamber sends materials. The valve I can be a ball valve, a gate valve, etc., and its power is electrical, hydraulic, pneumatic or mechanical drive; the airtight pressure grade of valve I can be 0.1-3 MPa.

Further, the material sending chamber is used to store the quantitative materials measured by the feeding valve, and uses compressed air as power to apply the materials into the soil layer through the material delivery pipe and the material spraying injector; the material sending chamber is provided with a material flow aid device for initial fluidization of the materials in the material sending chamber (3-4), and the material flow aid device comprises, but is not limited to, a suitable mechanical stirring flow aid device or an airflow blowing device, for example, a spinner is provided at the inner side thereof or a air nozzle is provided at the bottom thereof; the volume of the material sending chamber needs to meet the requirement that a single material spraying amount is 0.25-20 kg, which can be 1-30 L; the compressed air pressure for sending materials in the material sending chamber can be 0.1-3 MPa, and the ratio of the air quantity required for single sending to the material amount is 3-50.

Further, valve II is used to cut off/communicate the material sending chamber and the material delivery pipe, so as to ensure the airtight isolation between the material sending chamber and the material delivery pipe when the material sending chamber does not send materials, and prevent the unfluidized material from entering the material delivery pipe and the material spraying injector to block the passage. At the same time, valve II can isolate the air blasting system from the material feeding system. The valve II can be a ball valve, a gate valve, etc., and its power is electrical, hydraulic, pneumatic or mechanical drive; the airtight pressure grade of valve II can be 0.1-3 MPa.

Further, the material delivery pipe is connected with the air blasting system for delivering materials to the material spraying injector. The inner diameter of the material delivery pipe is DN10~DN100, the material delivery pipe is a straight-through pipe, and its structure is a reducer pipe similar to a nozzle. The material delivery pipe extends into the bottom of the high-pressure air tank, the distance between the material delivery pipe and the inlet of the quick relieve valve is small enough, and the outlet faces the inlet of the quick relieve valve, so that the material in the material delivery pipe can be directly sprayed into the material spraying injector.

The present disclosure further provides an implementation method of a pneumatic serial device for spraying materials into a deep soil layer, comprising the following content.

First, it involves the following concept definitions:

The soil layer comprises soil or soil layer for agriculture, forestry, grassland, landscaping, environmental protection, mine remediation, ecological remediation, site remediation, groundwater pollution control or building engineering construction; the soil layer also comprises sludge/bottom mud, river and lake bottom mud, beach mud, landfill, bio-pile, organic fertilizer fermentation pile, biogas fermentation tanks, etc.

The materials mainly include powdery solid materials and solid-liquid mixed materials, including but not limited to powdery solid for soil remediation and improvement, such as a soil remediation agent, a soil conditioner, a soil improver, an oxidant, a reducing agent, a curing/stabilizing agent, a microbial inoculum, various forms of fertilizers, clay, sand, straw powder, activated carbon, cement, concrete, etc.

The depth of the soil layer is 10 cm~30 m below the ground surface, which comprises applying materials to the shallow soil layer which is shallower from the ground surface, the root material transportation of superficial plants such as lawns, etc., and also comprises the improvement and remediation operations for the soil layer with the depth below 30 m during deep well operation, especially for groundwater pollution control, deterioration soil layer control and desertification soil layer control.

The air comprises compressed air and/or high-pressure steam/gas, which specifically refers to compressed high-pressure air or other high-pressure steam/gas here, including high-pressure steam/gas after solid, liquid and other gases are converted into compressed air, including but not limited to water vapor.

Second, the operation is carried out according to the following methods:

S1, Analyzing the Soil Layer Situation, the Applying Device and Material preparation analyzing the soil layer situation to be operated, knowing its texture, determining the type, component proportion, depth and application amount of materials to be applied into the soil layer, matching with the parameters of the applying device, and selecting a suitable applying device;

S2, Placing the Material Spraying Injector into the Soil placing the material spraying injector into a certain depth of the soil layer where materials need to be sprayed; when the spraying depth is shallow, the material spraying injector is directly placed into the soil; when the spraying depth is deep, other devices are first used to drill holes with a certain depth in advance for the planned operation point, and then placing the material spraying injector into a certain depth of soil;

S3: Air Blasting and Material Applying (1) When there is Insufficient Gap in the Soil Layer ① turning on valve I and turning off valve II, delivering a certain amount of materials into the material sending chamber through a feeding valve; then turning off valve I; at the same time, filling air with a certain pressure and volume into the high-pressure air tank;

② starting the material flow aid device to initially fluidize the materials in the material sending chamber, then introducing high-pressure air into the material sending chamber, turning on the quick relieve valve and valve II (the quick relieve valve and valve II are in a linkage mode), the high-pressure air carrying the materials through the material delivery pipe and sending the materials to the bottom of the high-pressure air tank, the materials entering the material spraying injector and applying into the soil layer with the blast air flow in the high-pressure air tank, realizing the simultaneous implementation of air blasting and material spraying;

(2) When there is Sufficient Gap in the Soil Layer

① turning on valve I and turning off valve II, delivering a certain amount of materials into the material sending chamber through the feeding valve; then turning off valve I;

② starting the rotating device or spraying a small amount of air to initially fluidize the materials in the material sending chamber, then introducing high-pressure air into the material sending chamber, turning on the quick relieve valve and valve II (the quick relieve valve and valve II are in a linkage mode), the high-pressure air carrying the materials through the material delivery pipe and sending the materials to the bottom of the high-pressure air tank, the materials entering the material spraying injector and spraying into the soil layer, realizing material spraying;

S4: Recycling S2-S3 recycling the above steps at different depths of the same operating point or the next operating point of the same operating area.

Compared with the prior art, the present disclosure has the following beneficial effects.

1. The material can be sprayed to the deep soil in situ, replacing the traditional operation mode of manual excavation, mechanical excavation and mechanical crushing and mixing.

2. It can spray materials to the soil/soil layer at any depth, which is more applicable to the operating depth range than the traditional mechanical mixing method.

3. The spraying and uniform mixing of materials in the deep soil can be realized by one operation, while the traditional method needs a combination of multiple operation procedures.

4. The feeding amount of materials is accurate, which avoids the waste of materials and the instability of remediation and improvement effect.

5. The configured serial air blasting system can realize the integrated operation of blasting and spraying materials for the soil with insufficient porosity to provide the filling space for spraying materials, thus avoiding the switching between the air blasting system and the material spraying system in the parallel device and improving the efficiency of the device.

6. The material spraying system with high-air-pressure and high-air-tightness can ensure that the materials can be uniformly and quantitatively applied to the soil with a certain depth and range, which high is efficiency and reliability.

7. The device and the method provided by the present disclosure can uniformly apply a certain amount of various materials into the soil layer at any depth, replacing the traditional method, greatly improving the operation efficiency of applying materials into the deep soil layer, significantly reducing the cost of applying materials into the deep soil layer, and reducing the labor intensity.

BRIEF DESCRIPTION OF THE DRAWINGS

FIG. 1 is a pneumatic serial device for applying materials into a deep soil layer according to the present disclosure.

DETAILED DESCRIPTION OF THE EMBODIMENTS

In order to make the purpose, technical scheme and advantages of the present disclosure clearer, the present disclosure will be described in detail in conjunction with embodiments hereinafter. It is necessary to point out that the following embodiments are only used to explain and illustrate the present disclosure, rather than limit the present disclosure. Some immaterial improvements and adjustments made by those skilled in the art according to the summary described above still belong to the scope of protection of the present disclosure.

Embodiment 1

The present disclosure relates to a pneumatic serial device for spraying materials into a deep soil layer, wherein the device comprises a material spraying injector 1, a air blasting system 2 connected with the material spraying injector 1, and a material feeding system 3, wherein the air blasting system 2 and the material feeding system 3 are connected with the material spraying injector 1 in series in sequence, wherein the interior of the material spraying injector 1 is hollow; the air blasting system 2 comprises a high-pressure air tank 2-1 and a quick relieve valve 2-2, the high-pressure air tank 2-1 is fixedly connected with the quick relieve valve 2-2; the quick relieve valve 2-2 is connected with the material spraying injector 1; the material feeding system 3 comprises a material chamber 3-1, a feeding valve 3-2, a valve I 3-3, a material sending chamber 3-4, a valve II 3-5 and a material delivery pipe 3-6 which are connected to each other in sequence; and the material delivery pipe 3-6 extends into the high-pressure air tank 2-1 and is communicated with the quick relieve valve 2-2 at the bottom thereof. The material delivery pipe 3-6 extends into the bottom of the high-pressure air tank 2-1, the distance between the end of the material delivery pipe 3-6 and the inlet of the quick relieve valve 2-2 is small enough, and the outlet faces the inlet of the quick relieve valve 2-2.

The material spraying device is applied to the material spraying of shallow soil such as agriculture, forestry, grass, horticulture, etc., and the implementation method thereof comprises the following steps.

S1, Analyzing the Soil Layer Situation, the Spraying Device and Material Preparation The remediation and improvement of soil such as agriculture, forestry, grass, horticulture involves the spraying depth of materials in the range of 0~1 m, which belongs to shallow soil and is a air-liquid-solid-phase body. The existing problems are mainly soil hardening, lack of organic matter, lack of nutrient elements, heavy metal pollution and soil acidification and salinization.

According to the characteristics of the above soil, the main types of materials to be applied include a compound fertilizer, an organic fertilizer, a microbial agent (fertilizer), a heavy metal curing agent/stabilizer, a passivator, lime and other substances, and the application amount at a single operation point is 0.25~5 kg.

According to the above soil and material characteristics, the main parameters of the spraying device are as follows: the maximum depth of the material spraying device injector 1 is 1 m, and the diameter is 10~50 mm; the pressure of the air blasting system 2 is 0.5~2.5 MPa, and the volume of the high-pressure air tank 2-1 is 5~30 L; the volume of the material sending chamber 3-4 is 1-10 L, and the pressure of high-pressure air of the material sending chamber is 0.1-1.5 MPa.

S2, Placing the Material Spraying Injector into the Soil

The material spraying injector 1 is placed into a certain depth (the maximum depth is 1 m) of the soil layer where materials need to be sprayed.

S3: Air Blasting and Material Spraying

① turning on valve I 3-3 and turning off valve II 3-5, delivering a certain amount of materials into the material sending chamber 3-4 through a feeding valve 3-2; then turning off valve I 3-3; at the same time, filling air with a certain pressure and volume into the high-pressure air tank 2-1;

② starting the material flow aid device to initially fluidize the materials in the material sending chamber 3-4, then introducing high-pressure air into the material sending chamber 3-4, turning on the quick relieve valve 2-2 and valve II 3-5 (the quick relieve valve 2-2 and valve II 3-5 are in a linkage mode), the high-pressure air carrying the materials through the material delivery pipe 3-6 and sending the materials to the bottom of the high-pressure air tank 2-1, the materials entering the material spraying injector 1 and spraying into the soil layer with the blast air flow in the high-pressure air tank 2-1, realizing the simultaneous implementation of air blasting and material spraying; and after the high-pressure air is introduced into the material sending chamber 3-4, keeping the material sending chamber 3-4 communicated with the high-pressure air source.

The pressure of the air filled into the high-pressure air tank 2-1 is higher than that of the high-pressure air source connected to the material sending chamber 3-4.

S4: Recycling S2-S3

The above steps at the next operating point of the same operating area are recycled.

By applying the device and the method described above to the remediation and improvement of shallow soil, quantitative materials can be uniformly sprayed into the soil layer with a specified depth at one time, thus avoiding the problems of many processes, complex process, poor uniformity, inaccurate application amount, high labor intensity, high operation cost and the like existing in the traditional methods of manual spraying, manual trenching, pit spraying and mechanical rotary tillage mixing.

Embodiment 2

Consistent with Embodiment 1, the material spraying device is applied to the remediation and improvement of site soil, and the implementation method thereof comprises the following steps:

S1, Analyzing the Soil Layer Situation, the Spraying Device and Material preparation The site remediation and improvement involve the spraying depth of materials in the range of 1~30 m. The main pollutants involved in this type of soil and the soil layer include heavy metals, petroleum hydrocarbons, semi-volatile organic pollutants, volatile organic pollutants, organic-metal pollutants such as acid pollution and alkali pollution, as well as groundwater pollution caused by this.

According to the characteristics of the above soil, the main types of materials to be applied include a metal curing agent/stabilizer, a curing agent, an oxidant, a reducing agent, a biological agent and other substances, and the application amount at a single operation point is 0.25~20 kg.

According to the above soil and material characteristics, the main parameters of the spraying device are as follows: the maximum depth of the material spraying device injector 1 is 30 m, and the diameter is 30~200 mm; the pressure of the air blasting system 2 is 2~5 MPa, and the volume of the high-pressure air tank 2-1 is 20~200 L; the volume of the material sending chamber 4-4 is 5-30 L, and the pressure of high-pressure air of the material sending chamber is 0.1-3 MPa.

S2, Placing the Material Spraying Injector into the Soil

The material spraying injector 1 is placed into a certain depth of the soil layer where materials need to be sprayed; the material spraying injector 1 is directly placed into the soil; or holes are drilled with a certain depth in advance for the planned operation point, and then the material spraying injector 1 is placed into a certain depth of soil.

S3: Air Blasting and Material Spraying

① turning on valve I 3-3 and turning off valve II 3-5, delivering a certain amount of materials into the material sending chamber 3-4 through a feeding valve 3-2; then turning off valve I 3-3; at the same time, filling air with a certain pressure and volume into the high-pressure air tank 2-1;

② starting the rotating device or spraying a small amount of air to initially fluidize the materials in the material sending chamber 3-4, then introducing high-pressure air into the material sending chamber 3-4, turning on the quick relieve valve 2-2 and valve II 3-5 (the quick relieve valve 2-2 and valve II 3-5 are in a linkage mode), the high-pressure air carrying the materials through the material delivery pipe 3-6 and sending the materials to the bottom of the high-pressure air tank 2-1, the materials entering the material spraying injector 1 and spraying into the soil layer with the blast air flow in the high-pressure air tank 2-1, realizing the simultaneous implementation of air blasting and material spraying.

After the high-pressure air is introduced into the material sending chamber 3-4, the material sending chamber 3-4 keeps communicated with the high-pressure air source.

The pressure of the air filled into the high-pressure air tank 2-1 is higher than that of the high-pressure air source connected to the material sending chamber 3-4.

S4: Recycling S2-S3

For deep soil, at the same operation point, after one operation is completed, the material spraying injector 1 can be lifted by 1~3 meters, recycling S3 until all materials are sprayed in the whole depth range of the soil layer at the same operation point.

S5: Recycling S2-S4

The above steps at the next operating point of the same operating area are recycled.

By applying the device and the method described above to the remediation and improvement of deep soil, quantitative materials can be uniformly sprayed into the soil layer with a specified depth, thus avoiding the problems of many processes, complex process, huge mechanical equipment, high energy consumption, poor uniformity, inaccurate application amount, long operation period, high operation cost and the like existing in the traditional methods of mechanical digging, mechanical crushing and mixing, and mechanical stirring.

Embodiment 3

Consistent with Embodiment 1, the material spraying device is applied to the mine remediation, and the implementation method thereof comprises the following steps:

S1, Analyzing the Soil Layer Situation, the Spraying Device and Material preparation Mine remediation involves the land destroyed by mining activities that cannot be used without treatment; there are mainly waste rock piles, mine pits, tailings wasteland, mining auxiliary buildings and abandoned land occupied by roads; the main pollutants involved in this type of soil and the soil layer include heavy metals, extreme pH value, salinization, lack of medium for plant rooting and extension such as topsoil, poor water and fertilizer retention ability, lack of nutrients such as nitrogen, phosphorus and potassium, lack of organic matter, etc.

According to the above characteristics of soil/soil layer, the main types of materials to be applied include: a curing agent/stabilizer; a filler such as guest soil for improving the physical and chemical properties of soil; an organic fertilizer, a chemical fertilizer, a microbial fertilizer, etc. for improving soil nutrition; a regulator for adjusting soil pH value, etc. The porosity of this type of soil/soil layer is very large, and the amount of materials to be filled is large.

According to the above soil and material characteristics, the main parameters of the spraying device are as follows: the maximum depth of the material spraying device injector 1 is 30 m, and the diameter is 30~200 mm; the volume of the material sending chamber 4-4 is 30 L or more, and the pressure of the high-pressure air of the material sending chamber is 0.5~3 MPa.

S2, Placing the Material Spraying Injector into the Soil

The material spraying injector 1 is placed into a certain depth of the soil layer where materials need to be sprayed; the material spraying injector 1 is directly placed into the soil; or holes are drilled with a certain depth in advance for the planned operation point, and then the material spraying injector 1 is placed into a certain depth of soil.

S3: Material Spraying

① turning on valve I 3-3 and turning off valve II 3-5, delivering a certain amount of materials into the material sending chamber 3-4 through a feeding valve 3-2; then turning off valve I 3-3;

② starting the rotating device or spraying a small amount of air to initially fluidize the materials in the material sending chamber 3-4, then introducing high-pressure air into the material sending chamber 3-4, turning on the quick relieve valve 2-2 and valve II 3-5 (the quick relieve valve 2-2 and valve II 3-5 are in a linkage mode), the high-pressure air carrying the materials through the material delivery pipe 3-6 and sending the materials to the bottom of the high-pressure air tank 2-1, the materials entering the material spraying injector 1 and spraying into the soil layer, realizing material spraying.

After the high-pressure air is introduced into the material sending chamber 3-4, the material sending chamber 3-4 keeps communicated with the high-pressure air source.

S4: Recycling S3

For deep soil, at the same operation point, after one operation is completed, the material spraying injector 1 can be lifted by 0.5~1 m, recycling S3 until all materials are sprayed in the whole depth range of the soil layer at the same operation point.

S5: Recycling S2-S4

The above steps at the next operating point of the same operating area are recycled.

By applying the device and the method described above to the mine remediation, quantitative materials can be uniformly sprayed into the soil layer with a specified depth, thus avoiding the problems of many processes, complex process, huge mechanical equipment, high energy consumption, poor uniformity, inaccurate application amount, long operation period, high operation cost and the like existing in the traditional methods of manual handling, mechanical digging, mechanical crushing and mixing, and mechanical stirring.

Embodiment 4

Consistent with Embodiment 1, the material spraying device is applied to the sludge and seepage pit treatment, and the implementation method thereof comprises the following steps:

S1, Analyzing the Soil Layer Situation, the Applying Device and Material preparation The soil/soil layer involved in sludge and seepage pit treatment mainly include river and lake bottom mud, sludge pond, seepage pit, beach mud, landfill, bio-pile, organic fertilizer fermentation pile, biogas fermentation tanks, etc.

According to the characteristics of the above soil, the main types of materials to be applied include: a curing agent/stabilizer, curing agent, oxidant, reducing agent, a biological agent, air and other substances.

According to the above soil and material characteristics, the main parameters of the spraying device are as follows: the maximum depth of the material spraying device injector 1 is 30 m, and the diameter is 30~200 mm; the volume of the material sending chamber 4-4 is 5-30 L, and the pressure of high-pressure air of the material sending chamber is 0.1-3 MPa.

S2, Placing the Material Spraying Injector into the Soil

The material spraying injector 1 is placed into a certain depth of the soil layer where materials need to be sprayed;

optionally, the material spraying injector 1 is directly placed into the soil; or holes are drilled with a certain depth in advance for the planned operation point, and then the material spraying injector 1 is placed into a certain depth of soil.

S3: Material Applying

① turning on valve I 3-3 and turning off valve II 3-5, delivering a certain amount of materials into the material sending chamber 3-4 through a feeding valve 3-2; and then turning off valve I 3-3;

② starting the rotating device or spraying a small amount of air to initially fluidize the materials in the material sending chamber 3-4, then introducing high-pressure air into the material sending chamber 3-4, turning on the quick relieve valve 2-2 and valve II 3-5 (the quick relieve valve 2-2 and valve II 3-5 are in a linkage mode), the high-pressure air carrying the materials through the material delivery pipe 3-6 and sending the materials to the bottom of the high-pressure air tank 2-1, the materials entering the material spraying injector 1 and spraying into the soil layer, realizing the material spraying.

After the high-pressure air is introduced into the material sending chamber 3-4, the material sending chamber 3-4 keeps communicated with the high-pressure air source.

S4: Recycling S2-S3

The above steps at the next operating point of the same operating area are recycled.

By applying the device and the method described above to the sludge and seepage pit treatment, quantitative materials can be uniformly sprayed into the soil layer with a specified depth, thus avoiding the problems of huge mechanical equipment, high energy consumption, poor uniformity, inaccurate application amount, long operation period, high operation cost and the like existing in the traditional methods of mechanical stirring.

Embodiment 5

Consistent with Embodiment 1, the material spraying device is applied to the desert control, and the implementation method thereof comprises the following steps:

S1, Analyzing the Soil Layer Situation, the Spraying Device and Material preparation According to the characteristics of desert control, the main types of materials to be applied include clay, a water-retaining agent, straw powder, an organic fertilizer, a fixative, rooting powder and other substances.

According to desert characteristics and material characteristics, the main parameters of the spraying device are as follows: the maximum depth of the material spraying device injector 1 is 5 m, and the diameter is 30~100 mm; the volume of the material sending chamber 4-4 is 5-30 L, and the pressure of high-pressure air of the material sending chamber is 0.1-5 MPa.

S2, Placing the Material Spraying Injector into the Soil

The material spraying injector 1 is placed into a certain depth of the soil layer where materials need to be sprayed.

S3, Spraying Materials to the Deep Sand Layer

① turning on valve I 3-3 and turning off valve II 3-5, delivering a certain amount of materials into the material sending chamber 3-4 through a feeding valve 3-2; and then turning off valve I 3-3;

② starting the rotating device or spraying a small amount of air to initially fluidize the materials in the material sending chamber 3-4, then introducing high-pressure air into the material sending chamber 3-4, turning on the quick relieve valve 2-2 and valve II 3-5 (the quick relieve valve 2-2 and valve II 3-5 are in a linkage mode), the high-pressure air carrying the materials through the material delivery pipe 3-6 and sending the materials to the bottom of the high-pressure air tank 2-1, the materials entering the material spraying injector 1 and spraying into the soil layer, realizing the material spraying.

After the high-pressure air is introduced into the material sending chamber 3-4, the material sending chamber 3-4 keeps communicated with the high-pressure air source.

S4: Recycling S3

At the same operation point, after one operation is completed, the material spraying injector 1 can be lifted by 0.5~1 m, recycling S3 until all materials are sprayed in the whole depth range of the soil layer at the same operation point.

S5: Recycling S2-S4

The above steps at the next operating point of the same operating area are recycled.

By applying the device and the method described above to the desert control, quantitative materials can be uniformly sprayed into the sand layer with a specified depth, thus avoiding the problems of huge mechanical equipment, high energy consumption, poor uniformity, inaccurate application amount, long operation period, high operation cost and the like existing in the traditional methods of mechanical stirring.

What is claimed is:

1. A pneumatic serial device for applying materials into a deep soil layer, wherein the device comprises a material spraying injector (1), an air blasting system (2) connected with the material spraying injector (1), and a material feeding system (3), wherein the air blasting system (2) and the material feeding system (3) are connected with the material spraying injector (1) in series in sequence, wherein the interior of the material spraying injector (1) is hollow; the air blasting system (2) comprises a high-pressure air tank (2-1) and a quick relieve valve (2-2), the high-pressure air tank (2-1) is fixedly connected with the quick relieve valve (2-2); the quick relieve valve (2-2) is connected with the material spraying injector (1); the material feeding system (3) comprises a material chamber (3-1), a feeding valve (3-2), a valve I (3-3), a material sending chamber (3-4), a valve II (3-5) and a material delivery pipe (3-6) which are connected to each other in sequence; and the material delivery pipe (3-6) extends into the high-pressure air tank (2-1) and is communicated with the bottom thereof.

2. The pneumatic serial device for spraying materials into a deep soil layer according to claim 1, wherein the material sending chamber (3-4) is provided with a material flow aid device for initial fluidization of the materials in the material sending chamber (3-4), and the material flow aid device comprises, but is not limited to, a suitable mechanical stirring flow aid device or an airflow blowing device.

3. The pneumatic serial device for spraying materials into a deep soil layer according to claim 1, wherein the feeding valve (3-2) is rotary, and its power is electrical, hydraulic, pneumatic or mechanical drive.

4. The pneumatic serial device for spraying materials into a deep soil layer according to claim 1, wherein the inner diameter of the material delivery pipe (3-6) is DN10~DN100, the material delivery pipe is a straight-through pipe, its structure is a reducer pipe similar to a nozzle; the material delivery pipe (3-6) extends into the bottom of the high-pressure air tank (2-1), the distance between the material delivery pipe (3-6) and the inlet of the quick relieve valve (2-2) is small enough, and the outlet faces the inlet of the quick relieve valve (2-2).

5. An implementation method of a pneumatic serial device for spraying materials into a deep soil layer according to claim 1, comprising the following steps:

S1, analyzing the soil layer situation, the spraying device and material preparation analyzing the soil layer situation to be operated, knowing its texture, determining the type, component proportion, depth and application amount of materials to be applied into the soil layer, matching with the parameters of the spraying device, and selecting a suitable spraying device;

S2, placing the material spraying injector into the soil placing the material spraying injector (1) into a certain depth of the soil layer where materials need to be sprayed; when the spraying depth is shallow, the material spraying injector (1) is directly placed into the soil; when the spraying depth is deep, other devices are first used to drill holes with a certain depth in advance for the planned operation point, and then placing the material spraying injector (1) into a certain depth of soil;

S3: air blasting and material spraying (1) when there is insufficient gap in the soil layer ① turning on valve I (3-3) and turning off valve 11 (3-5), delivering a certain amount of materials into the material sending chamber (3-4) through a feeding valve (3-2); then turning off valve I (3-3); at the same time, filling air with a certain pressure and volume into the high-pressure air tank (2-1);

② starting the material flow aid device to initially fluidize the materials in the material sending chamber (3-4), then introducing high-pressure air into the material sending chamber (3-4), turning on the quick relieve valve (2-2) and valve 11 (3-5), the high-pressure air carrying the materials through the material delivery pipe (3-6) and sending the materials to the bottom of the high-pressure air tank (2-1), the materials entering the material spraying injector (1) and spraying into the soil layer with the blast air flow in the high-pressure air tank (2-1), realizing the simultaneous implementation of air blasting and material spraying;

(2) when there is sufficient gap in the soil layer ① turning on valve I (3-3) and turning off valve 11 (3-5), delivering a certain amount of materials into the material sending chamber (3-4) through the feeding valve (3-2), then turning off valve I (3-3);

② starting the rotating device or spraying a small amount of air to initially fluidize the materials in the material sending chamber (3-4), then introducing high-pressure air into the material sending chamber (3-4), turning on the quick relieve valve (2-2) and valve 11 (3-5), the high-pressure air carrying the materials through the material delivery pipe (3-6) and sending the materials to the bottom of the high-pressure air tank (2-1), the materials entering the material spraying injector (1) and spraying into the soil layer, realizing material spraying;

S4: recycling S2-S3 recycling the above steps at different depths of the same operating point or the next operating point of the same operating area.

6. An implementation method of a pneumatic serial device for spraying materials into a deep soil layer according to claim 1, comprising the following steps:

S1, analyzing the soil layer situation, the spraying device and material preparation analyzing the soil layer situation to be operated, knowing its texture, determining the type, component proportion, depth and application amount of materials to be applied into the soil layer, matching with the parameters of the spraying device, and selecting a suitable spraying device;

S2, placing the material spraying injector into the soil placing the material spraying injector (1) into a certain depth of the soil layer where materials need to be sprayed; when the spraying depth is shallow, the material spraying injector (1) is directly placed into the soil; when the spraying depth is deep, other devices are first used to drill holes with a certain depth in advance for the planned operation point, and then placing the material spraying injector (1) into a certain depth of soil;

S3: air blasting and material spraying (1) when there is insufficient gap in the soil layer ① turning on valve I (3-3) and turning off valve 11 (3-5), delivering a certain amount of materials into the material sending chamber (3-4) through a feeding valve (3-2); then turning off valve I (3-3); at the same time, filling air with a certain pressure and volume into the high-pressure air tank (2-1);

② starting the material flow aid device to initially fluidize the materials in the material sending chamber (3-4), then connecting the material sending chamber (3-4) with the high-pressure air source, turning on the quick relieve valve (2-2) and valve 11 (3-5), the high-pressure air carrying the materials through the material delivery pipe (3-6) and sending the materials to the bottom of the high-pressure air tank (2-1), the materials entering the material spraying injector (1) and spraying into the soil layer with the blast air flow in the high-pressure air tank (2-1), realizing the simultaneous implementation of air blasting and material spraying;

the pressure of the air filled into the high-pressure air tank (2-1) being higher than that of the high-pressure air source connected to the material sending chamber (3-4);

(2) when there is sufficient gap in the soil layer

① turning on valve I (3-3) and turning off valve 11 (3-5), delivering a certain amount of materials into the material sending chamber (3-4) through the feeding valve (3-2); then turning off valve I (3-3);

② starting the rotating device or spraying a small amount of air to initially fluidize the materials in the material sending chamber (3-4), then connecting the material sending chamber (3-4) with the high-pressure air source, turning on the quick relieve valve (2-2) and valve 11 (3-5), the high-pressure air carrying the materials through the material delivery pipe (3-6) and sending the materials to the bottom of the high-pressure air tank (2-1), the materials entering the material spraying injector (1) and spraying into the soil layer, realizing material spraying;

S4: recycling S2-S3 recycling the above steps at different depths of the same operating point or the next operating point of the same operating area.

7. The implementation method according to claim 6, wherein the air pressure in the high-pressure air tank is 0.5-5 MPa, and the compressed air pressure used for sending materials in the material sending chamber is 0.1-3 MPa.

* * * * *